United States Patent
Lee et al.

(10) Patent No.: US 12,260,537 B2
(45) Date of Patent: Mar. 25, 2025

(54) DEFECT DETECTION METHOD, COMPUTER DEVICE AND STORAGE MEDIUM

(71) Applicant: HON HAI PRECISION INDUSTRY CO., LTD., New Taipei (TW)

(72) Inventors: Wan-Jhen Lee, New Taipei (TW); Tung-Tso Tsai, New Taipei (TW); Chin-Pin Kuo, New Taipei (TW); Tzu-Chen Lin, New Taipei (TW); Guo-Chin Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 868 days.

(21) Appl. No.: 17/382,504

(22) Filed: Jul. 22, 2021

(65) Prior Publication Data

US 2022/0028055 A1    Jan. 27, 2022

(30) Foreign Application Priority Data

Jul. 22, 2020   (CN) .......................... 202010712515.X

(51) Int. Cl.
*G06T 7/00* (2017.01)
*G06N 3/084* (2023.01)

(52) U.S. Cl.
CPC .......... *G06T 7/0004* (2013.01); *G06N 3/084* (2013.01); *G06T 2207/20081* (2013.01); *G06T 2207/20084* (2013.01)

(58) Field of Classification Search
CPC ......... G06T 7/0004; G06T 2207/20081; G06T 2207/20084; G06T 2207/20021; G06T 2207/30164; G06N 3/084; G06N 3/045; G06F 18/214
See application file for complete search history.

(56) References Cited

U.S. PATENT DOCUMENTS

| | | | |
|---|---|---|---|
| 9,464,992 B2 | 10/2016 | Rudolph | |
| 9,786,045 B2 | 10/2017 | Hayashi | |
| 2021/0383526 A1* | 12/2021 | Chen | G06T 7/0004 |
| 2022/0044382 A1* | 2/2022 | Chuang | G06T 7/001 |
| 2022/0207706 A1* | 6/2022 | Kuo | G01N 21/8851 |
| 2022/0207714 A1* | 6/2022 | Yang | G06N 3/045 |
| 2022/0269996 A1* | 8/2022 | Nogami | G06N 3/045 |
| 2022/0309640 A1* | 9/2022 | Liu | G01N 21/8851 |
| 2022/0383479 A1* | 12/2022 | Lin | G06T 7/0002 |
| 2023/0196756 A1* | 6/2023 | Tan | G06V 10/993 382/100 |

FOREIGN PATENT DOCUMENTS

| | | |
|---|---|---|
| CN | 109598287 | 4/2019 |
| CN | 109615604 | 4/2019 |
| CN | 109858536 | 6/2019 |
| TW | 201941114 A | 10/2019 |
| TW | 202014985 A | 4/2020 |

* cited by examiner

*Primary Examiner* — Bobbak Safaipour
(74) *Attorney, Agent, or Firm* — ScienBiziP, P.C.

(57) ABSTRACT

A product defect detection method which includes acquiring a detection image of a product to be detected is provided. The method further includes dividing the detection image into a first preset number of detection blocks. Once a detection result of each detection block is obtained by inputting each detection block into a preset defect recognition model, according to a position of each detection block in the detection image, a detection result of the product is determined according to the detection result of each detection block.

20 Claims, 4 Drawing Sheets

DEFECT DETECTION METHOD, COMPUTER DEVICE AND STORAGE MEDIUM

FIELD

The present disclosure relates to product quality control technology field, in particular to a defect detection method, a computer device, and a storage medium.

BACKGROUND

Currently, deep learning network architecture can be used to detect product defects. Usually, an image of a product is input into a deep learning network model to obtain a product detection result. However, a resolution and a size of the input image may affect precision and speed of detection. If the resolution of the input image is high and the size is large, although a detection precision is high, the speed of detection may be greatly reduced, so it cannot meet requirements of industrial speed. If the resolution of the input image is reduced, precision of detection will be reduced.

FIG: 3 shows a flow chart of one embodiment of a product defect detection method of the present disclosure.

Figure 4:
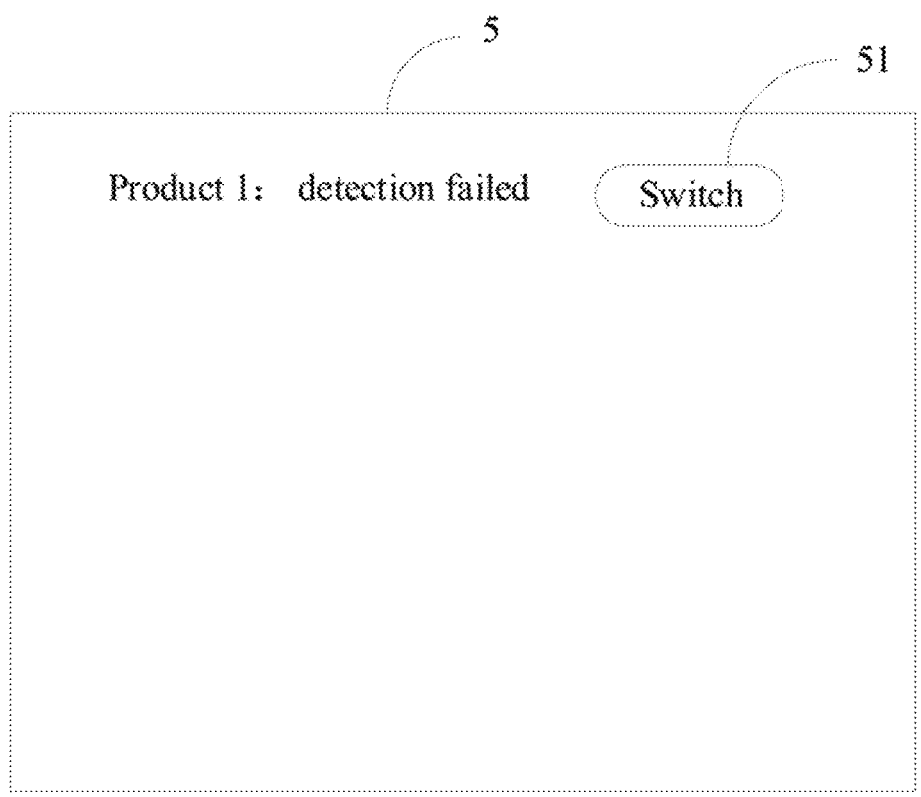

FIG. 4 illustrates a first user interface.

Figure 5:
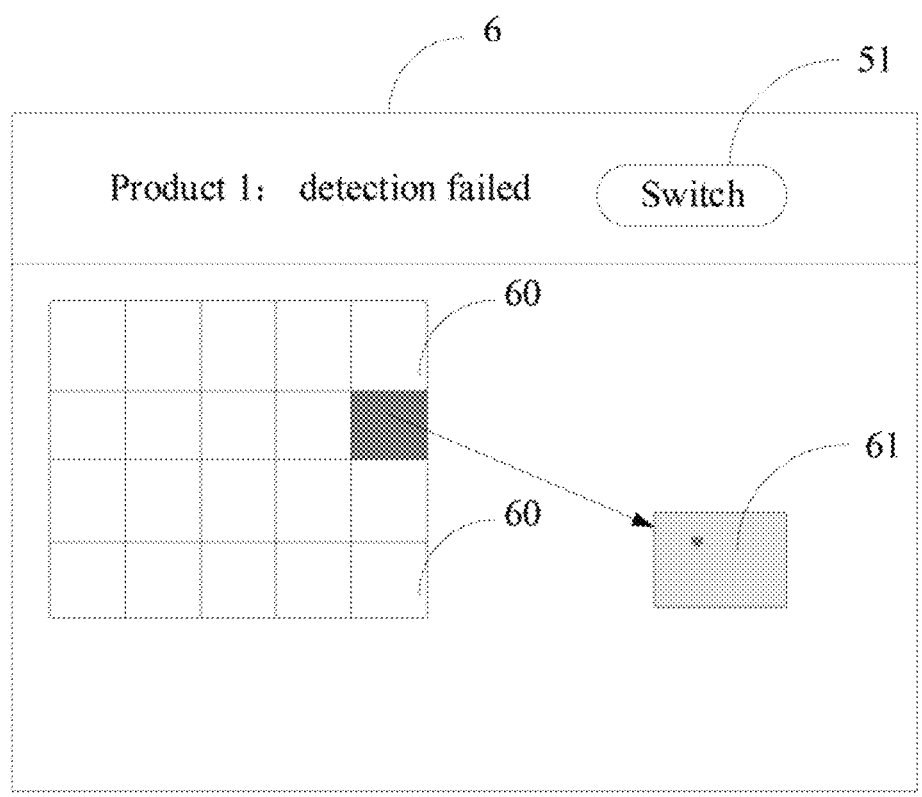

FIG. 5 illustrates a second user interface.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
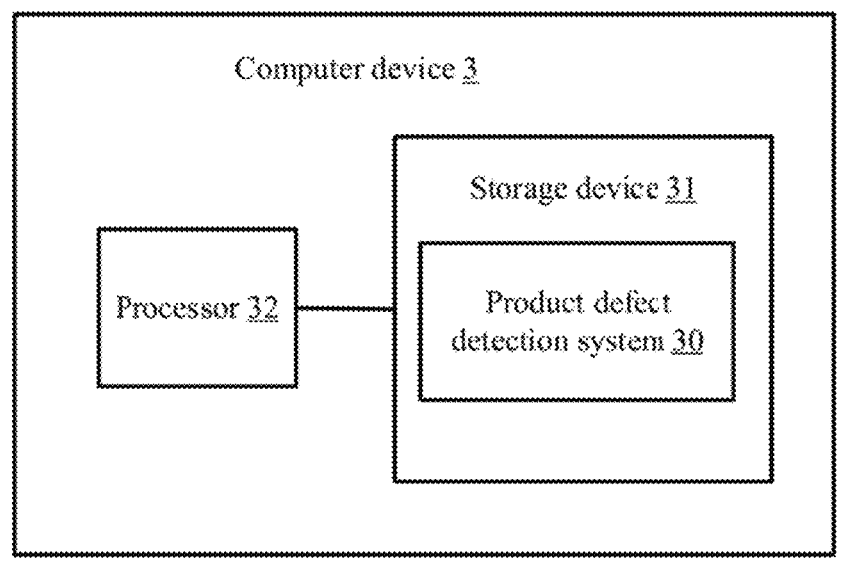
FIG. 1 illustrates a schematic diagram of a computer device according to one embodiment of the present disclosure.

FIG. 1 illustrates a schematic diagram of a computer device of the present disclosure.

In at least one embodiment, the computer device 3 includes a storage device 31, at least one processor 32. The storage device 31 and the at least one processor 32 are in electrical communication with each other.

Those skilled in the art should understand that the structure of the computer device 3 shown in FIG. 1 does not constitute a limitation of the embodiment of the present disclosure. The computer device 3 can further include more or less other hardware or software than that shown in FIG. 1, or the computer device 3 can have different component arrangements.

It should be noted that the computer device 3 is merely an example. If another kind of computer device can be adapted to the present disclosure, it should also be included in the protection scope of the present disclosure, and incorporated herein by reference In some embodiments, the storage device 31 may be used to store program codes and various data of computer programs. For example, the storage device 31 may be used to store a product defect detection system 30 installed in the computer device 3 and implement completion of storing programs or data during an operation of the computer device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the computer device 3. The at least one processor 32 uses various interfaces and lines to connect various components of the computer device 3, and executes programs or modules or instructions stored in the storage device 31, and invokes data stored in the storage device 31 to perform various functions of the computer device 3 and to process data, for example, perform a function of detecting product defect (for details, see the description of FIG. 3).

In this embodiment, the product defect detection system 30 can include one or more modules. The one or more modules are stored in the storage device 31 and. are executed by at least one processor (e.g. processor 32 in this embodiment), such that a function of detecting product defect (for details, see the introduction to FIG. 3 below) is achieved.

In this embodiment, the product defect detection system 30 can include a plurality of modules. Referring to FIG: 2, the plurality of modules includes an obtaining module 301, an execution module 302. The module referred to in the present disclosure refers to a series of computer-readable instructions that can be executed by at least one processor (for example, the processor 32), and can complete functions, and can be stored in a storage device (for example, the storage device 31 of the computer device 3). In this embodiment, functions of each module will be described in detail with reference to FIG. 3.

Figure 3:
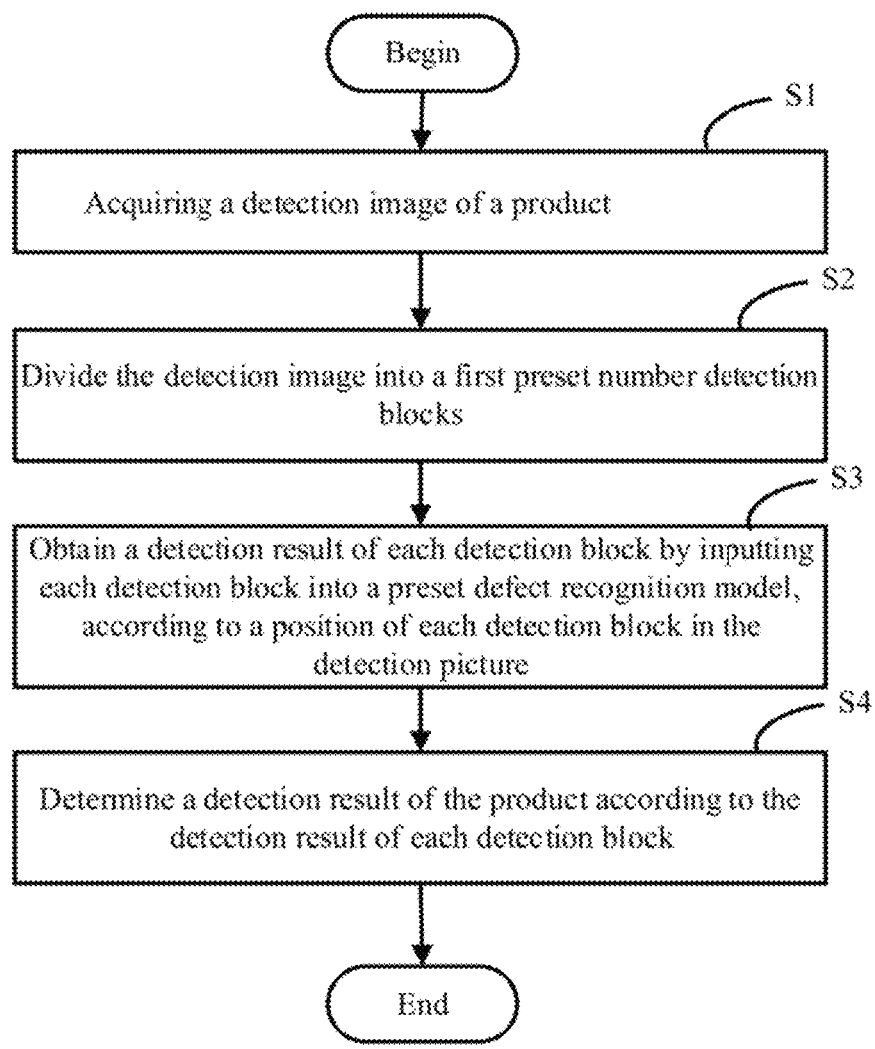

In this embodiment, an integrated unit implemented in a form of a software module can be stored in a non-transitory readable storage medium. The above modules include one or more computer-readable instructions. The computer device 3 or a processor implements the one or more computer-readable instructions, such that the method for detecting product defect shown in FIG. 3 is achieved.

Figure 2:
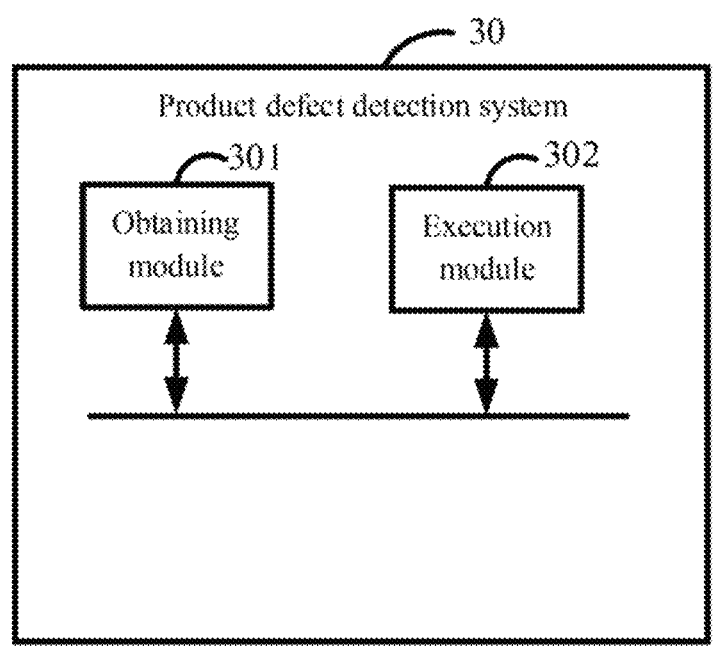
FIG. 2 shows one embodiment of modules of a product defect detection system of the present disclosure.

In a further embodiment, referring to FIG. 2, the at least one processor 32 can execute an operating system of the computer device 3, various types of applications (such as the product defect detection system 30 described above), program codes, and the like.

In a further embodiment, the storage device 31 stores program codes of a computer program, and the at least one processor 32 can invoke the program codes stored in the storage device 31 to achieve related functions. For example, each module of the product defect detection system 30 shown in FIG. 2 is program code stored in the storage device 31. Each module of the product defect detection system 30 shown in FIG. 2 is executed by the at least one processor 32, such that the functions of the modules are achieved, and the purpose of detecting product defect (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of detecting product defect. Specifically, the computer-readable instructions executed by the at least one processor 32 to achieve the purpose of detecting product defect is described in detail in FIG. 3 below.

It should be noted that, in other embodiments, the product defect detection system 30 may also be implemented as an embedded system with a storage device, a processor, and other necessary hardware or software.

FIG. 3 is a flowchart of a product defect detection method according to a preferred embodiment of the present disclosure.

In this embodiment, the product defect detection method can be applied to the computer device 3. For the computer device 3 that requires detecting product defect, the computer device 3 can be directly integrated with the function of detecting product defect. The computer device 3 can also achieve the function of detecting product defect by running a Software Development Kit (SDK).

FIG: 3 shows a flow chart of one embodiment of a product defect detection method. Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried. out in the method. Furthermore, the illustrated order of blocks is illustrative only and the order of the blocks can be changed. Additional blocks can be added or fewer blocks can be utilized without departing from this disclosure. The example method can begin at block S1.

At block S1, the obtaining module 301 acquires an image of a product to be detected (for a clear and simple description of the present disclosure, the image of the product to be detected is hereinafter referred to as a "detection image").

The product to be detected refers to a product that needs to be detected for defects. For example, the product to be detected can be a case of a mobile phone, a protective cover of a mobile phone, or any other suitable products.

In one embodiment, the obtaining module 301 may use a camera (not shown in the figure) to photograph the product to be detected to obtain a detection image of the product to be detected. Of course, the detection image of the product to be detected can also be stored in the storage device 31 in advance, and the obtaining module 301 can directly obtain the detection image of the product from the storage device 31.

At block S2, the execution module 302 divides the detection image into a first preset number (for example, 20, 22, or other numerical values) of blocks (for a clear and simple description of the present disclosure, each of the first preset number of blocks obtained by dividing the detection image is hereinafter referred to as a "detection block").

In one embodiment, the execution module 302 also records a position of each detection block in the detection image.

In one embodiment, the execution module 302 can establish a coordinate system XOY by setting a lower left corner of the detection image as an origin O, setting a lower horizontal edge of the detection image as an X axis, and setting a left vertical edge of the detection image as a Y axis. The position of each detection block in the detection image refers to a range of position coordinates in the coordinate system XOY It should be noted that the coordinate system XOY can also be established in other ways, for example, the coordinate system XOY can established by setting a lower right corner of the detection image as the origin, setting the lower horizontal edge of the detection image as the X axis, and setting a right vertical edge of the detection image as the Y axis. This is only an example and should not be construed as a limitation to the present disclosure.

In one embodiment, a size of each detection block of the first preset number of detection blocks is the same. In other embodiments, the size of each detection block of the first preset number of detection blocks can be different.

At block S3, the execution module 302 can obtain a detection result of each detection block by inputting each detection block into a preset defect recognition model according to the position of each detection block in the detection image.

In one embodiment, the detection result includes the detection block is flawless or the detection block is flawed.

In an embodiment, the execution module 302 obtains the defect recognition model, and the obtaining the defect recognition model includes (a1)-(a6):

(a1) Collecting a second preset number (for example, 100,000, 200,000 or other values) of defect images.

In one embodiment, a size of each defect image of the second preset number of defect images is the same, and the size of each defect image is the same as the size of the detection image.

In this embodiment, the defect image refers to an image of the product having defect.

(a2) Dividing each defect image of the second preset number of defect images into the first preset number of blocks (each of the preset number of blocks obtained by dividing the each defect image hereinafter referred to as "defect block").

In one embodiment, a size of each defect block of the first preset number of defect blocks is the same. In other embodiments, the size of each defect block of the first preset number of defect blocks can be different.

(a3) Associating each defect block of the first preset number of defect blocks with a position of each defect block in the corresponding defect image.

In one embodiment, the execution module 302 can establish a coordinate system X'O'Y' by setting a lower left corner of the defect image as an origin O', setting a lower horizontal edge of the defect image as an X' axis, and setting a left vertical edge of the defect image as the Y' axis. The position of each defect block in the corresponding defect image refers to a range of position coordinates in the coordinate system X'O'Y'. It should be noted that the method of establishing the coordinate system X'O'Y' of the defect image needs to be the same as the method of establishing the coordinate system XOY of the detection image.

(a4) Taking all of defect blocks corresponding to a same position as a training sample, thereby obtaining multiple training samples. Each training sample includes all of the defect blocks corresponding to a same position.

(a5) Obtaining multiple defect recognition models by training a neural network separately based on each of the training samples.

In one embodiment, the training the neural network can be performed by training a convolutional neural network model using a neural network training algorithm, such as a back-propagation algorithm. The neural network training algorithm used for training the convolutional neural network model is a well-known technology, and will not be repeated here.

(a6) Associating each of the multiple defect recognition models with the position of the corresponding training sample.

According to the above blocks, the execution module 302 takes the defect blocks corresponding to the same position of all the defect images as a training sample, and trains the defect recognition model based on the training sample. Therefore, when performing defect detection, the corresponding detection model can be invoked for detection according to the position of the detection block in the detection image.

For example, suppose that each defect image of the second preset number of defect images is divided into two defect blocks, and the positions of the two defect blocks in the defect image are respectively recorded as P1 and P2. Then, the defect blocks each of which is corresponding to the position P1 among all the defect blocks are used as a first training sample, and the defect blocks each of which is corresponding to the position P2 among all the defect blocks are used as a second training sample. A defect recognition model M1 is obtained by training the neural network using the first training sample, and a defect recognition model M2 is obtained by training the neural network using the second training sample. When the detection image needs to be detected, the detection image is divided into two detection blocks, and the positions of the two detection blocks in the detection image respectively are recorded as P1 and P2. Then, the detection block corresponding to the position P1 can be input to the defect recognition model M1 for detecting defects, and the detection block corresponding to the position P2 can be input into the defect recognition model M2 for detecting defects. Such that a purpose of simultaneous detection of different detection blocks is realized, and a detection rate can be increased.

At block S4, the execution module 302 determines a detection result of the product according to the detection result of each detection block.

In this embodiment, when the detection result of each of all detection blocks indicates that each detection block is flawless, the execution module 302 determines that the product is flawless and the product passes the detection. When at least one detection block is determined to be flawed according to the detection result, the execution module 302 determines that the product is flawed and the product fails the detection.

In one embodiment, the execution module 302 may generate a first user interface, and display the detection result of the product on the first user interface. The execution module 302 can receive a user's first input signal from the first user interface, and display the detection result of each detection block of the first preset number of detection blocks in response to the first input signal.

In one embodiment, the execution module 302 can further display the detection result of each detection block of the detection image according to the position of each detection block in the detection image.

In one embodiment, the execution module 302 can also generate a second user interface in response to the first input signal; and display the first preset number of patterns on the second user interface, each of the first preset number patterns represents a detection result of one detection block of the first preset number of detection blocks, wherein different styles of the pattern indicates different detection results. For example, when the style of a pattern is gray, it means that the corresponding detection block is flawed and the corresponding detection block does not pass the detection; when the style of the pattern is in another color, such as white, it means that the corresponding detection block is flawless and the corresponding detection block passed the detection.

In one embodiment, the execution module 302 displays a designated button on the first user interface, and the first input signal is a signal received from the designated button. The signal may be, for example, a touch signal or a double tap signal.

For example, referring to FIG. 4, the execution module 302 generates a second user interface 6 when a signal from a button 51 on a first user interface 5 is received. The execution module 302 displays twenty patterns 60 on the second user interface 6, and the twenty patterns 60 respectively represent the detection results of twenty detection blocks. A position of each of the twenty patterns 60 on the second. user interface 6 is corresponding to a position of each of the twenty detection blocks in the detection image. Among them, when the pattern is gray, it means that the corresponding detection block is flawed and does pass the detection, and when the pattern is white, it means that the corresponding detection block is flawless and has passed the detection.

In one embodiment, the execution module 302 can also associate each pattern of the first preset number of patterns with a corresponding detection block; detect second input signal and an input position of the second input signal from the second user interface; display a detection block corresponding to any pattern of the first preset number of patterns on the second user interface when the input position of the second input signal is located at the position of the any pattern.

For example, referring to FIG. 5, when the execution module 302 receives the users input signal from the position of the gray pattern, the execution module 302 displays a detection block 61 corresponding to the position of the gray pattern in the detection image. In one embodiment, the execution module 302 can further display a designated button on the second user interface; and switch from the second user interface to the first user interface when a third input signal is received from the designated button.

For example, referring to FIG. 5, the execution module 302 displays a button 51 on the second user interface 5. When the execution module 302 receives a user input signal from the button 51, the execution module 302 switches from the second user interface 6 to the first user interface 5.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A product defect detection method applied to a computer device, the method comprising:
acquiring a detection image of a product;
dividing the detection image into a first preset number of detection blocks;
obtaining a detection result of each detection block by inputting each detection block into a preset defect recognition model that is corresponding to a position of each detection block in the detection image, wherein different positions corresponding to different preset defect recognition models; and
determining a detection result of the product according to the detection result of each detection block.

2. The product defect detection method according to claim 1, further comprising:
collecting a second preset number of defect images;
dividing each defect image of the second preset number of defect images into the first preset number of defect blocks;
associating each defect block of the first preset number of defect blocks with a position of each defect block in the corresponding defect image;
obtaining a plurality of training samples by setting all of defect blocks corresponding to a same position as a training sample;
obtaining a plurality of defect recognition models by training a neural network separately based on each of the training samples; and
associating each of the plurality of defect recognition models with the position of the corresponding training sample.

3. The product defect detection method according to claim 1, further comprising:
generating a first user interface, and displaying the detection result of the product on the first user interface;
receiving a first input signal from the first user interface; and
displaying the detection result of each detection block of the first preset number of detection blocks in response to the first input signal.

4. The product defect detection method according to claim 3, further comprising:
recording a position of each detection block in the detection image;
displaying the detection result of each detection block of the first preset number of detection blocks according to the position of each detection block in the detection image.

5. The product defect detection method according to claim 4, further comprising:
generating a second user interface in response to the first input signal; and
displaying the first preset number of patterns on the second user interface, each of the first preset number patterns representing a detection result of one detection block of the first preset number of detection blocks, different styles of the pattern indicating different detection results.

6. The product defect detection method according to claim 5, further comprising:
associating each pattern of the first preset number of patterns with a corresponding detection block;
detecting second input signal and an input position of the second input signal from the second user interface; and
displaying a detection block corresponding to any pattern of the first preset number of patterns on the second user interface when the input position of the second input signal is located at the position of the any pattern.

7. The product defect detection method according to claim 6, further comprising:
displaying a button on the second user interface; and
switching from the second user interface to the first user interface when an input signal is received from the button.

8. A computer device comprising:
a storage device;
at least one processor; and
the storage device storing one or more programs, which when executed by the at least one processor, cause the at least one processor to:
acquire a detection image of a product;
divide the detection image into a first preset number of detection blocks;
obtain a detection result of each detection block by inputting each detection block into a preset defect recognition model that is corresponding to a position of each detection block in the detection image, wherein different positions corresponding to different preset defect recognition models; and
determine a detection result of the product according to the detection result of each detection block.

9. The computer device according to claim 8, wherein the at least one processor is further caused to:
collect a second preset number of defect images;
divide each defect image of the second preset number of defect images into the first preset number of defect blocks;
associate each defect block of the first preset number of defect blocks with a position of each defect block in the corresponding defect image;
obtain a plurality of training samples by setting all of defect blocks corresponding to a same position as a training sample;
obtain a plurality of defect recognition models by training a neural network separately based on each of the training samples; and
associate each of the plurality of defect recognition models with the position of the corresponding training sample.

10. The computer device according to claim 8, wherein the at least one processor is further caused to:
generate a first user interface, and displaying the detection result of the product on the first user interface;
receive a first input signal from the first user interface; and
display the detection result of each detection block of the first preset number of detection blocks in response to the first input signal.

11. The computer device according to claim 10, wherein the at least one processor is further caused to:
record a position of each detection block in the detection image;
display the detection result of each detection block of the first preset number of detection blocks according to the position of each detection block in the detection image.

12. The computer device according to claim 11, wherein the at least one processor is further caused to:
generate a second user interface in response to the first input signal; and
display the first preset number of patterns on the second user interface, each of the first preset number patterns representing a detection result of one detection block of the first preset number of detection blocks, different styles of the pattern indicating different detection results.

13. The computer device according to claim 12, wherein the at least one processor is further caused to:
associate each pattern of the first preset number of patterns with a corresponding detection block;
detect second input signal and an input position of the second input signal from the second user interface; and
display a detection block corresponding to any pattern of the first preset number of patterns on the second user interface when the input position of the second input signal is located at the position of the any pattern.

14. The computer device according to claim 13, wherein the at least one processor is further caused to:
display a button on the second user interface; and
switch from the second user interface to the first user interface when an input signal is received from the button.

15. A non-transitory storage medium having instructions stored thereon, when the instructions are executed by a processor of a computer device, the processor is configured to perform a product defect detection method, wherein the method comprises:
acquiring a detection image of a product;
dividing the detection image into a first preset number of detection blocks;
obtaining a detection result of each detection block by inputting each detection block into a preset defect recognition model that is corresponding to a position of each detection block in the detection image, wherein different positions corresponding to different preset defect recognition models; and
determining a detection result of the product according to the detection result of each detection block.

16. The non-transitory storage medium according to claim 15, wherein the method further comprising:
collecting a second preset number of defect images;
dividing each defect image of the second preset number of defect images into the first preset number of defect blocks;
associating each defect block of the first preset number of defect blocks with a position of each defect block in the corresponding defect image;
obtaining a plurality of training samples by setting all of defect blocks corresponding to a same position as a training sample;
obtaining a plurality of defect recognition models by training a neural network separately based on each of the training samples; and
associating each of the plurality of defect recognition models with the position of the corresponding training sample.

17. The non-transitory storage medium according to claim 15, wherein the method further comprising:
generating a first user interface, and displaying the detection result of the product on the first user interface;
receiving a first input signal from the first user interface; and
displaying the detection result of each detection block of the first preset number of detection blocks in response to the first input signal.

18. The non-transitory storage medium according to claim 17, wherein the method further comprising:
recording a position of each detection block in the detection image;
displaying the detection result of each detection block of the first preset number of detection blocks according to the position of each detection block in the detection image.

19. The non-transitory storage medium according to claim 18, wherein the method further comprising:
generating a second user interface in response to the first input signal; and
displaying the first preset number of patterns on the second user interface, each of the first preset number patterns representing a detection result of one detection block of the first preset number of detection blocks, different styles of the pattern indicating different detection results.

20. The non-transitory storage medium according to claim 19, wherein the method further comprising:
associating each pattern of the first preset number of patterns with a corresponding detection block;
detecting second input signal and an input position of the second input signal from the second user interface; and
displaying a detection block corresponding to any pattern of the first preset number of patterns on the second user interface when the input position of the second input signal is located at the position of the any pattern.

* * * * *